(12) United States Patent
Kim et al.

(10) Patent No.: US 12,269,250 B2
(45) Date of Patent: ***Apr. 8, 2025

(54) POLARIZING PLATE AND OPTICAL DISPLAY DEVICE COMPRISING SAME

(71) Applicant: Samsung SDI Co., Ltd., Yongin-si (KR)

(72) Inventors: Yoon Jung Kim, Suwon-si (KR); Sang Hum Lee, Suwon-si (KR); Ri Ra Jung, Suwon-si (KR); Yeon Ju Jung, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 767 days.

This patent is subject to a terminal disclaimer.

(21) Appl. No.: 17/593,905

(22) PCT Filed: Jun. 10, 2020

(86) PCT No.: PCT/KR2020/007520
§ 371 (c)(1),
(2) Date: Sep. 27, 2021

(87) PCT Pub. No.: WO2020/256337
PCT Pub. Date: Dec. 24, 2020

(65) Prior Publication Data
US 2022/0187522 A1 Jun. 16, 2022

(30) Foreign Application Priority Data
Jun. 19, 2019 (KR) .................. 10-2019-0073170

(51) Int. Cl.
*B32B 7/023* (2019.01)
*B32B 27/32* (2006.01)
(Continued)

(52) U.S. Cl.
CPC .............. *B32B 7/023* (2019.01); *B32B 27/32* (2013.01); *G02B 5/305* (2013.01);
(Continued)

(58) Field of Classification Search
CPC ...... G02B 5/305; G02B 5/3016; B32B 7/023; B32B 27/32; B32B 2255/10;
(Continued)

(56) References Cited

U.S. PATENT DOCUMENTS 11,681,085 B2 * 6/2023 Koo .................. G02B 5/3083
349/117
2006/0098146 A1 5/2006 Yano et al.
(Continued)

FOREIGN PATENT DOCUMENTS

CN 1717615 A 1/2006
CN 101959950 A 1/2011
(Continued)

OTHER PUBLICATIONS

International Search Report for corresponding Application No. PCT/KR2020/007520 dated Sep. 23, 2020, 4pp.
(Continued)

*Primary Examiner* — George G. King
(74) *Attorney, Agent, or Firm* — Womble Bond Dickinson (US) LLP (57) ABSTRACT

Provided are a polarizing plate and an optical display device comprising same, the polarizing plate comprising: a polarizer; and a first phase difference layer, a second phase difference layer and a third phase difference layer which are sequentially stacked on the lower surface of the polarizer. The first phase difference layer comprises a positive C phase difference layer. The second phase difference layer has positive wavelength dispersibility and an in-plane phase difference of approximately 200 nm to 280 nm in a wave-
(Continued)

length of 550 nm. The third phase difference layer has positive wavelength dispersibility and an in-plane phase difference of approximately 80 nm to 145 nm in a wavelength of 550 nm. When the absorption axis of the polarizer is 0°, the angle formed by the slow axis of the second phase difference layer is approximately +14° to +24° or approximately −24° to −14°, and the angle formed by the slow axis of the third phase difference layer is approximately +79° to +89° or approximately −89° to −79°.

16 Claims, 3 Drawing Sheets (51) Int. Cl.
  *G02B 5/30* (2006.01)
  *G02F 1/13363* (2006.01)

(52) U.S. Cl.
  CPC ....... *B32B 2255/10* (2013.01); *B32B 2255/26* (2013.01); *B32B 2307/418* (2013.01); *B32B 2307/42* (2013.01); *B32B 2457/20* (2013.01); *G02F 1/13363* (2013.01)

(58) Field of Classification Search
  CPC .......... B32B 2255/26; B32B 2307/418; B32B 2307/42; B32B 2457/20; B32B 25/08; B32B 27/08; B32B 27/18; B32B 27/281; B32B 2250/24; B32B 2307/412; B32B 2307/416; B32B 2457/206; B32B 7/12; B32B 25/14; B32B 27/20; B32B 27/286; B32B 27/302; B32B 27/304; B32B 27/306; B32B 27/308; B32B 27/325; B32B 27/34; B32B 27/36; B32B 27/365; B32B 27/40; B32B 23/08; B32B 23/20; B32B 33/00; B32B 2307/40; G02F 1/133509; G02F 1/13363; G02F 2413/03; G02F 2413/07; G02F 2413/08; G02F 1/133634; G02F 1/133637; G02F 1/133528; G09F 9/33
  See application file for complete search history.

(56) References Cited

U.S. PATENT DOCUMENTS

| | | |
|---|---|---|
| 2006/0165918 A1 | 7/2006 | Ito |
| 2006/0274229 A1 | 12/2006 | Ito et al. |
| 2010/0134910 A1 | 6/2010 | Chae et al. |
| 2014/0168579 A1 | 6/2014 | Kim |
| 2014/0293420 A1 | 10/2014 | Ko et al. |
| 2015/0002010 A1 | 1/2015 | Lee |
| 2015/0042944 A1 | 2/2015 | Hatanaka et al. |
| 2016/0025913 A1 | 1/2016 | Oh et al. |
| 2018/0095211 A1 | 4/2018 | Lee |
| 2019/0331838 A1 | 10/2019 | Konno et al. |
| 2021/0033768 A1* | 2/2021 | Koo ..................... G02B 5/3041 |

FOREIGN PATENT DOCUMENTS

| | | |
|---|---|---|
| CN | 104076430 A | 10/2014 |
| CN | 104133321 A | 11/2014 |
| CN | 104252016 A | 12/2014 |
| CN | 104345371 A | 2/2015 |
| CN | 105301688 A | 2/2016 |
| CN | 107884863 A | 4/2018 |
| CN | 109791242 A | 5/2019 |
| JP | 2013-164525 A | 8/2013 |
| KR | 10-2013-0103595 A | 9/2013 |
| KR | 10-2014-0094391 A | 7/2014 |
| KR | 10-2015-0046279 A | 4/2015 |
| KR | 10-2016-0012274 A | 2/2016 |
| KR | 10-2016-0107114 A | 9/2016 |
| KR | 10-2017-0046631 | 5/2017 |
| KR | 10-2017-0117961 | 10/2017 |
| TW | 201447397 A | 12/2014 |
| TW | 201504695 A | 2/2015 |
| WO | WO 2004/008197 A1 | 1/2004 |
| WO | WO 2018-110277 | 6/2018 |

OTHER PUBLICATIONS

Taiwan Office action dated Sep. 8, 2021 issued in corresponding Taiwan Application No. 109125619, 11 pages.
China Office Action dated Feb. 23, 2022 issued in corresponding Chinese Patent Application No. 202010749929.X, 9 pages.
US Office Action dated Mar. 14, 2024, issued in U.S. Appl. No. 18/312,960 (14 pages).
US Final Office Action dated Sep. 20, 2024, issued in U.S. Appl. No. 18/312,960 (13 pages).
Korean Office action dated Jan. 14, 2022 issued in corresponding KR Patent Application No. 10-2019-0073170, with English Translation, 9 pages.

* cited by examiner

POLARIZING PLATE AND OPTICAL DISPLAY DEVICE COMPRISING SAME

CROSS-REFERENCE TO RELATED APPLICATIONS

This application is a U.S. National Phase Patent Application of International Application Number PCT/KR2020/007520, filed on Jun. 10, 2020, which claims priority of Korean Patent Application Number 10-2019-0073170, filed on Jun. 19, 2019, the entire content of each of which is incorporated herein by reference.

BACKGROUND

1. Field

The present invention relates to a polarizing plate and an optical display device including the same. More particularly, the present invention relates to a polarizing plate, which can reduce color scattering at all azimuths including a polar angle of 60° and the like in application to an optical display device, and an optical display device including the same.

2. Brief Description of Background Art

An organic electroluminescent (EL) panel includes a metal electrode layer having high reflectivity. Accordingly, the organic EL panel suffers from deterioration in visibility due to reflection with respect to external light. A polarizing plate may be attached to the organic EL panel to prevent deterioration in visibility of the organic EL panel.

The polarizing plate includes a polarizer and a compensation film disposed on one surface of the polarizer. The polarizing plate serves to improve screen quality by converting linear polarization into circular polarization in the course of emission of incident external light through reflection on the metal electrode layer while blocking circular polarization to reduce final reflectivity. Since an optical display device generally has higher reflectivity at a lateral side than at a front side thereof, a polarizing plate for reducing reflectivity at the lateral side (reflectivity at a polar angle) has been developed. On the other hand, despite reduction in reflectivity at the lateral side, the display device can exhibit poor visibility when the display device has high color scattering at all azimuths including a polar angle of 60° and the like. Even a polarizing plate adapted to reduce reflectivity at the lateral side can exhibit high color scattering. Therefore, there is a need for development of a polarizing plate that can reduce color scattering and reflectivity at the lateral side.

The background technique of the present invention is disclosed in Korean Patent Laid-open Publication No. 10-2016-0107114 and the like.

SUMMARY

It is an aspect of the present invention to provide a polarizing plate that can achieve remarkable reduction in color scattering.

It is another aspect of the present invention to provide a polarizing plate that can achieve remarkable reduction in reflectivity at a lateral side.

It is a further aspect of the present invention to provide a polarizing plate that enables thickness reduction while improving productivity.

One aspect of the present invention relates to a polarizing plate.

1. The polarizing plate includes: a polarizer; and a first retardation layer, a second retardation layer and a third retardation layer sequentially stacked on a lower surface of the polarizer, wherein the first retardation layer is a positive C retardation layer, the second retardation layer exhibits positive dispersion and has an in-plane retardation of about 220 nm to about 280 nm at a wavelength of 550 nm, the third retardation layer exhibits positive dispersion and has an in-plane retardation of about 80 nm to about 145 nm at a wavelength of 550 nm, and assuming that an absorption axis of the polarizer is tilted at an angle of 0°, the second retardation layer has a slow axis tilted at an angle θ2 of about +14° to about +24° or at an angle θ2 of about −24° to about −14° with respect to the absorption axis of the polarizer and the third retardation layer has a slow axis tilted at an angle θ3 of about +79° to about +89° or at an angle θ3 of about −89° to about −79° with respect to the absorption axis of the polarizer.

2. In 1, the angle θ2 may range from about +14° to about +24° and the angle θ3 may range from about +79° to about +89°.

3. In 1 and 2, the angle θ2 may range from about −24° to about −14° and the angle θ3 may range from about −89° to about −79°.

4. In 1 to 3, an angle θ1 defined between the slow axis of the second retardation layer and the slow axis of the third retardation layer may range from about 61° to about 67°.

5. In 1 to 4, a laminate of the first retardation layer, the second retardation layer and the third retardation layer may have a degree of biaxiality of about 0.4 to about 1.0 at a wavelength of 550 nm.

6. In 1 to 5, one of the second retardation layer and the third retardation layer may satisfy Relation 3 and the other retardation layer may satisfy Relation 6:

$$nx > ny \approx nz, \quad \text{[Relation 3]}$$

where nx, ny, and nz are indexes of refraction of the retardation layer in a slow axis direction, a fast axis direction and a thickness direction at a wavelength of 550 nm, respectively.

$$nx \approx nz > ny, \quad \text{[Relation 6]}$$

where nx, ny, and nz are indexes of refraction of the retardation layer in the slow axis direction, the fast axis direction and the thickness direction at a wavelength of 550 nm, respectively.

7. In 1 to 6, a laminate of the second retardation layer and the third retardation layer may exhibit negative dispersion.

8. In 1 to 7, the second retardation layer may satisfy Relations 1 and 2:

about 1.0 < Re(450)/Re(550) ≤ about 1.1    [Relation 1]

about 0.9 ≤ Re(650)/Re(550) < about 1.0,    [Relation 2]

where Re(450), Re(550), and Re(650) are in-plane retardations (unit: nm) of the second retardation layer at wavelengths of 450 nm, 550 nm, and 650 nm, respectively.

9. In 1 to 7, the second retardation layer may have a smaller Re(450)/Re(550) than the third retardation layer and a greater Re(650)/Re(550) than the third retardation layer.

10. In 1 to 9, the third retardation layer may satisfy Relations 4 and 5:

about 1.0 < Re(450)/Re(550) ≤ about 1.2    [Relation 4]

about 0.9 ≤ Re(650)/Re(550) < about 1.0,    [Relation 5]

where Re(450), Re(550), and Re(650) are in-plane retardations (unit: nm) of the third retardation layer at wavelengths of 450 nm, 550 nm, and 650 nm, respectively.

11. In 1 to 10, the first retardation layer may have an index of refraction (nx) of about 1.5 to about 1.6, an index of refraction (ny) of about 1.5 to about 1.6, and an index of refraction (nz) of about 1.6 to about 1.7 at a wavelength of 550 nm.

12. In 1 to 11, the first retardation layer may have an out-of-plane retardation about −150 nm to about 0 nm at a wavelength of 550 nm.

13. In 1 to 12, the second retardation layer may include a cyclic olefin polymer film and the third retardation layer may include a polystyrene coating layer.

14. In 1 to 13, the polarizing plate may further include a protective layer between an upper surface of the polarizer or the polarizer and the first retardation layer.

15. In 1 to 14, the polarizing plate may further include an adhesive layer or a bonding layer on a lower surface of the third retardation layer.

An optical display device according to the present invention includes the polarizing plate according to the present invention.

The present invention provides a polarizing plate that can achieve remarkable reduction in color scattering.

The present invention provides a polarizing plate that can achieve remarkable reduction in reflectivity at a lateral side.

The present invention provides a polarizing plate that enables thickness reduction while improving productivity.

DETAILED DESCRIPTION

Hereinafter, embodiments of the present invention will be described in detail with reference to the accompanying drawings. It should be understood that the present invention may be embodied in different ways and is not limited to the following embodiments. The following embodiments of the present invention will be described in detail with reference to the accompanying drawings to provide thorough understanding of the invention to those skilled in the art. Although lengths, thicknesses or widths of various components may be exaggerated for understanding in the drawings, the present invention is not limited thereto. Like components will be denoted by like reference numerals throughout the drawings.

Herein, spatially relative terms such as "upper" and "lower" are defined with reference to the accompanying drawings. Thus, it will be understood that the term "upper surface" can be used interchangeably with the term "lower surface", and when an element such as a layer or a film is referred to as being placed "on" another element, it can be directly placed on the other element, or intervening element(s) may be present. On the other hand, when an element is referred to as being placed "directly on" another element, there are no intervening element(s) therebetween.

Herein, "in-plane retardation Re", "out-of-plane retardation Rth", and "degree of biaxiality NZ" are represented by Equations A, B and C, respectively:

$$Re = (nx - ny) \times d \quad \text{[Equation A]}$$

$$Rth = ((nx + ny)/2 - nz) \times d \quad \text{[Equation B]}$$

$$NZ = (nx - nz)/(nx - ny), \quad \text{[Equation C]}$$

where nx, ny, and nz are indexes of refraction of a corresponding optical device in the slow axis direction, the fast axis direction and the thickness direction of the optical device at a measurement wavelength, respectively, and d denotes the thickness of the optical device (unit: nm).

In Equations A to C, the "optical device" means a first retardation layer, a second retardation layer, a third retardation layer, or a laminate of the first retardation layer, the second retardation layer and the first retardation layer. In Equations A to C, the "measurement wavelength" means a wavelength of 450 nm, 550 nm, or 650 nm.

Herein, "(meth)acryl" means acryl and/or methacryl.

As used herein to represent a specific numerical range, the expression "X to Y" means "greater than or equal to X and less than or equal to Y (X and Y)".

The inventors of the present invention developed a polarizing plate according to the present invention by sequentially stacking a first retardation layer, a second retardation layer and a third retardation layer on a lower surface of a polarizer in the polarizing plate while adjusting a slow axis of each of the second retardation layer and the third retardation layer with respect to an absorption axis of the polarizer, and in-plane retardation and wavelength dispersion of each of the second retardation layer and the third retardation layer at a wavelength of 550 nm. In addition, the inventors of the present invention controlled the degree of biaxiality of the entirety of the first retardation layer, the second retardation layer and the third retardation layer at a wavelength of 550 nm.

The polarizing plate according to the present invention can reduce color scattering at all azimuths including a polar angle of 60° when applied to an optical display device, for example, a light emitting diode display device. Here, "color scattering" refers to difference between colors visible in each azimuth when the polarizing plate is applied to an optical display device.

The polarizing plate according to the present invention can reduce reflectivity at a polar angle θ of 0° to 60° corresponding to a lateral side of the optical display device. As a result, the polarizing plate according to the present invention can improve screen visibility on the entirety of the optical display device. In particular, a polarizing plate capable of reducing reflectivity at the lateral side cannot necessarily reduce color scattering, whereas the polarizing plate according to the present invention achieves remarkable improvement in screen visibility by reducing both reflectivity at the lateral side and color scattering. The polarizing plate according to the present invention can reduce reflectivity at the entirety of the lateral side to 1% or less, for example, 0% to 1%.

Next, a polarizing plate according to one embodiment of the present invention will be described with reference to FIG. 1.

Figure 1:
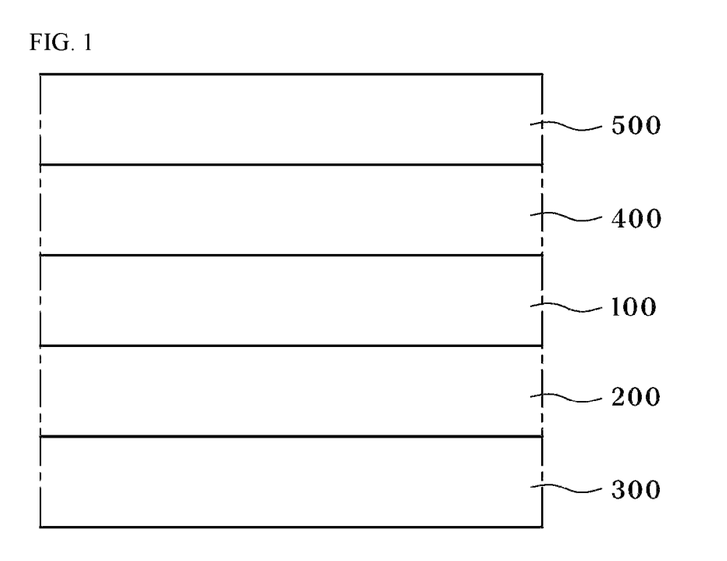
FIG. 1 is a sectional view of a polarizing plate according to one embodiment of the present invention.

Referring to FIG. 1, the polarizing plate includes a first retardation layer 100, a second retardation layer 200 and a third retardation layer 300 sequentially stacked on a lower surface of the polarizer 400. A protective layer 500 is stacked on an upper surface of the polarizer 400.

The first retardation layer includes a positive C retardation layer; and the second retardation layer and the third retardation layer have in-plane retardations described below and wavelength dispersion and slow axes tilted with respect to an absorption axis of the polarizer, as described below. With this structure, the polarizing plate can reduce color scattering and reflectivity at the entirety of the lateral side in application to an optical display device. In the polarizing plate of FIG. 1, when the first retardation layer is interposed between the second retardation layer and the third retardation layer and when the first retardation layer is disposed on a lower surface of the third retardation layer, color scattering becomes significant, causing deterioration in screen quality of the optical display device.

The first retardation layer, the second retardation layer and the third retardation layer have different in-plane retardations at a wavelength of 550 nm. The first retardation layer, the second retardation layer and the third retardation layer may have the same or different out-of-plane retardation and the same or different degree of biaxiality at a wavelength of 550 nm.

Second Retardation Layer

The second retardation layer 200 exhibits positive dispersion in which in-plane retardation gradually increases from a long wavelength to a short wavelength. When any one of the second retardation layer and the third retardation layer does not exhibit positive dispersion, the effects of the present invention cannot be sufficiently realized or can become insignificant.

Specifically, the second retardation layer may satisfy Relations 1 and 2:

about 1.0<Re(450)/Re(550)≤about 1.1 [Relation 1]

about 0.9≤Re(650)/Re(550)<about 1.0, [Relation 2]

where Re(450), Re(550), and Re(650) are in-plane retardations (unit: nm) of the second retardation layer at wavelengths of 450 nm, 550 nm, and 650 nm, respectively.

In one embodiment, the second retardation layer may have Re(450)/Re(550) of about 1.01 to about 1.05. Within this range, the polarizing plate can secure good effects in reduction of reflectivity at both a front side and a lateral side. For example, the second retardation layer may have Re(450)/Re(550) of about 1.01, 1.02, 1.03, 1.04, 1.05, 1.06, 1.07, 1.08, 1.09, or 1.1.

In one embodiment, the second retardation layer may have greater Re(650)/Re(550) than the third retardation layer and may have Re(650)/Re(550) of about 0.95 to less than about 1.00. Within this range, the polarizing plate can secure good effects in reduction of reflectivity at both a front side and a lateral side.

For example, the second retardation layer may have Re(650)/Re(550) of about 0.9, 0.91, 0.92, 0.93, 0.94, 0.95, 0.96, 0.97, 0.98, 0.99, 0.995, or 0.999.

In one embodiment, the second retardation layer may have smaller Re(450)/Re(550) than the third retardation layer and may have greater Re(650)/Re(550) than the third retardation layer. As a result, the polarizing plate can achieve reduction in reflectivity while suppressing color scattering.

The second retardation layer may have an in-plane retardation of about 220 nm to about 280 nm at a wavelength of 550 nm. Within this range, the polarizing plate can assist in reduction in color scattering and reflectivity. Specifically, the second retardation layer may have an in-plane retardation of about 225 nm to about 275 nm, more specifically about 230 nm to about 270 nm, most specifically about 230 nm to about 260 nm. For example, the second retardation layer may have an in-plane retardation of about 220 nm, 225 nm, 230 nm, 235 nm, 240 nm, 245 nm, 250 nm, 255 nm, 260 nm, 265 nm, 270 nm, 275 nm, or 280 nm at a wavelength of 550 nm.

In one embodiment, the second retardation layer may have an in-plane retardation of 220 nm to 280 nm, specifically 225 nm to 275 nm, more specifically 220 nm to 270 nm, still more specifically 230 nm to 270 nm, most specifically 230 nm to 260 nm at a wavelength of 450 nm. Within this range, the polarizing plate can achieve the above wavelength dispersion while reducing reflectivity at both a front side and a lateral side. For example, the second retardation layer may have an in-plane retardation of about 220 nm, 225 nm, 230 nm, 235 nm, 240 nm, 245 nm, 250 nm, 255 nm, 260 nm, 265 nm, 270 nm, 275 nm, or 280 nm at a wavelength of 450 nm.

In one embodiment, the second retardation layer may have an in-plane retardation of 220 nm to 280 nm, specifically 225 nm to 275 nm, more specifically 230 nm to 270 nm, most specifically 230 nm to 260 nm at a wavelength of 650 nm. Within this range, the polarizing plate can achieve the above wavelength dispersion while reducing reflectivity at both a front side and a lateral side. For example, the second retardation layer may have an in-plane retardation of about 220 nm, 225 nm, 230 nm, 235 nm, 240 nm, 245 nm, 250 nm, 255 nm, 260 nm, 265 nm, 270 nm, 275 nm, or 280 nm at a wavelength of 650 nm.

The slow axis of the second retardation layer is tilted at a particular angle with respect to the absorption axis (MD (machine direction)) of the polarizer.

Figure 2:
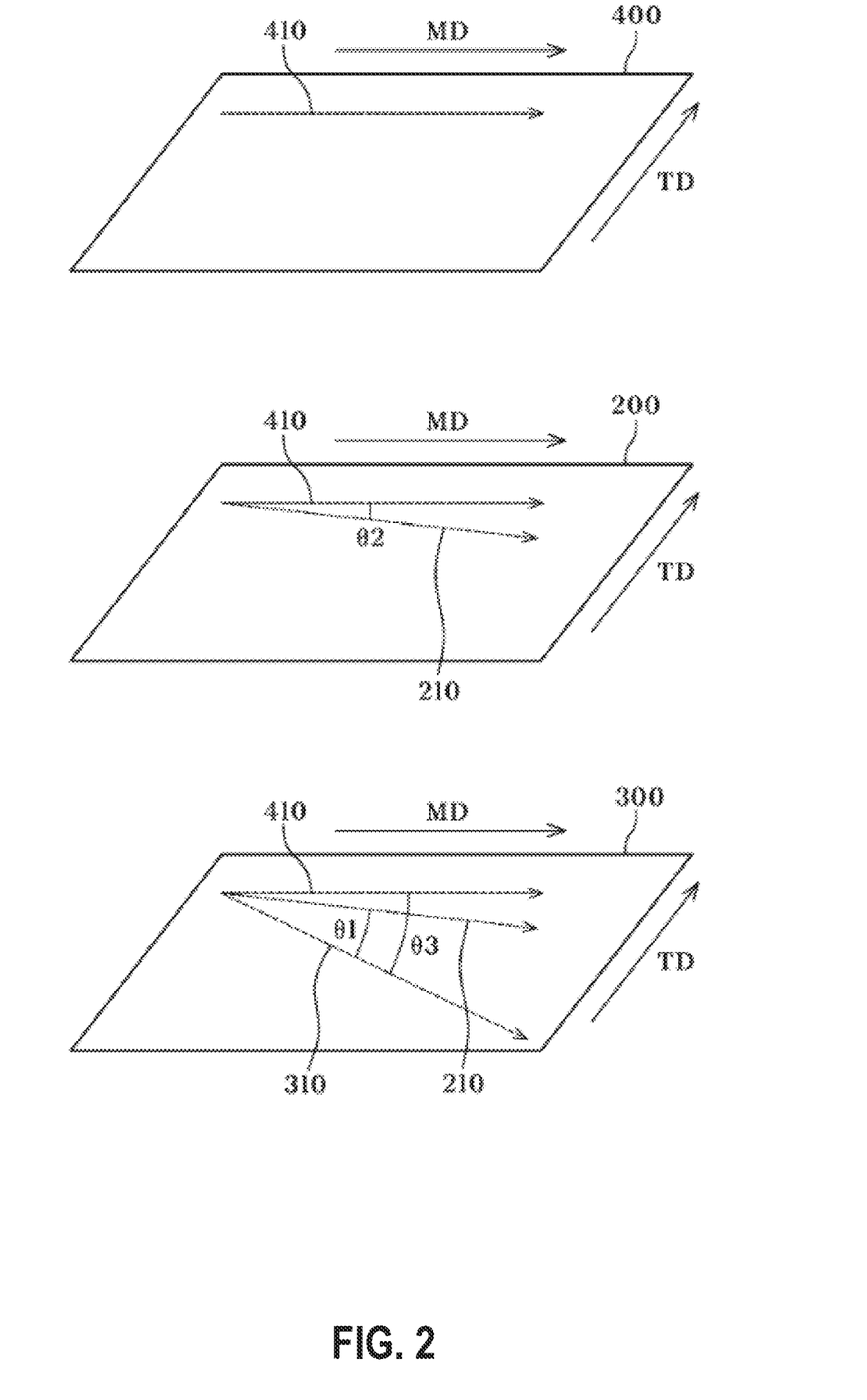
FIG. 2 is a view showing an absorption axis of a polarizer, a slow axis of a second retardation layer, and a slow axis of a third retardation layer in FIG. 1.

Referring to FIG. 2, assuming the absorption axis of the polarizer 400 is tilted at an angle of 0°, an angle θ2 defined between the slow axis 210 of the second retardation layer 200 and the absorption axis 410 of the polarizer may range from about +14° to about +24° or from about −24° to about −14°. Within this range, the polarizing plate can assist in reduction in color scattering and reflectivity while improving productivity by securing the effects of the present invention even when the second retardation layer is bonded to the polarizer through a roll-to-roll process. Preferably, the angle θ2 ranges from about +16° to about +22° or from about −22° to about −16°, more preferably from about +18° to about +21° or from about −21° to about −18°. For example, the angle θ2 may be about +14°, +15°, +16°, +17°, +18°, +19°, +20°, +21°, +22°, +23°, or +24°, or about −24°, −23°, −22°, −21°, −20°, −19°, −18°, −17°, −16°, −15°, or −14°.

As used herein to represent an angle, "+" means a clockwise direction and "−" means a counterclockwise direction about 0° (that is, the absorption axis of the polarizer). The above angle may be realized through adjustment of the angle between the absorption axis and the slow axis of the second retardation layer upon bonding the second retardation layer to the polarizer, without being limited thereto.

In one embodiment, the second retardation layer satisfies Relation 3. With this structure, the second retardation layer can reduce reflectivity at a lateral side.

$nx > ny \approx nz$, [Relation 3]

where nx, ny, and nz are indexes of refraction of the second retardation layer in the slow axis direction, the fast axis direction and the thickness direction at a wavelength of 550 nm, respectively.

In one embodiment, the second retardation layer is a positive A retardation layer. As a result, the polarizing plate can have a good effect in reduction of reflectivity at the entire lateral side.

In one embodiment, the second retardation layer may have a positive (+) out-of-plane retardation at a wavelength of 550 nm, for example, about 100 nm to about 300 nm, preferably about 110 nm to about 250 nm, more preferably about 150 nm to about 250 nm. Within this range, the polarizing plate can have a good effect in reduction of reflectivity at the entire lateral side.

In one embodiment, the second retardation layer may have a degree of biaxiality of about 0.1 to about 3.0, preferably about 1.0 to about 2.0, more preferably about 1.0 to about 1.5 at a wavelength of 550 nm. Within this range, the polarizing plate can have a good effect in reduction of reflectivity at the entire lateral side. For example, the second retardation layer may have a degree of biaxiality of about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 at a wavelength of 550 nm.

The second retardation layer may include a film formed of a composition including a resin having a positive inherent birefringence. Accordingly, the second retardation layer can be easily manufactured to have a higher index of refraction in a stretched direction than an index of refraction in a direction orthogonal to the stretched direction.

The resin having a positive inherent birefringence includes a polymer having a positive inherent birefringence. The polymer having a positive inherent birefringence may include at least one selected from among, for example, cyclic olefin polymers, such as a norbornene polymer and the like; polyesters, such as polyethylene terephthalate, polybutylene terephthalate, and the like; polyvinyl alcohol; polyvinyl chloride; polyaryl sulfone; polyolefin resins, such as polyethylene, polypropylene, and the like; polyarylate; and rod-like liquid crystal polymers, without being limited thereto. Specifically, polyolefin resins having good properties in terms of mechanical properties, heat resistance, transparency, and dimensional stability, cyclic olefin polymers, and polycarbonate resins having good properties in terms of exhibition of retardation and high stretching rate at low temperature are preferred. These polymers having a positive inherent birefringence may be used alone or as a mixture thereof. Preferably, the second retardation layer includes a cyclic olefin copolymer in consideration of slant stretching, wavelength dispersion, and the like.

Positive dispersion of the second retardation layer may be regulated in consideration of not only the kind of resin having a positive inherent birefringence but also the ratio of monomers in the resin.

The second retardation layer may further include typical additives in addition to the resin having a positive inherent birefringence. For example, the additives may include anti-pigmenting agents, such as pigments and dyes, heat stabilizers, photo-stabilizers, UV absorbents, antistatic agents, antioxidants, fine particles, and surfactants, without being limited thereto.

The second retardation layer may have a thickness of about 5 μm to about 100 μm, specifically about 5 μm to about 60 μm. Within this thickness range, the second retardation layer can be used in the polarizing plate.

The second retardation layer may be formed by preparing a non-stretched film through melt molding, injection molding, or press molding of the composition comprising the resin having a positive inherent birefringence, followed by stretching the non-stretched film in a slanted direction. The non-stretched film may be stretched to about 1.1 times or more, about 4.0 times or less, specifically about 1.3 times to about 3.0 times, an initial length of the non-stretched film. Within this range, the slow axis direction of the second retardation layer can be controlled and the index of refraction of the second retardation layer in a stretching direction can be increased. Stretching may be performed at a glass transition temperature (Tg) of the non-stretched film+2° C. or more to Tg+30° C. or less.

The stretching direction may be set to allow easy manufacture of the polarizing plate through a roll-to-roll process while satisfying the angle between the second retardation layer and the absorption angle of the polarizer.

Referring to FIG. 2, each of the polarizer and the second retardation layer is substantially parallel to the MD to allow manufacture of the polarizing plate through the roll-to-roll process, thereby improving productivity. As a result, the second retardation layer has a slow axis tilted at an angle of about +14° to about +24° or at about −24° to about −14°, preferably at about +16° to about +22° or at about −22° to about −16°, more preferably at about +18° to about +21° or at about −21° to about −18°, with respect to the MD thereof, achieving the effects of the present invention.

The second retardation layer may be present as the stretched film in the polarizing plate. Alternatively, a primer layer may be further formed on the second retardation layer to improve bonding strength between the second retardation layer and the third retardation layer. The primer layer may include at least one selected from among an acryl resin, a urethane resin, an acryl urethane resin, an ester resin, and an ethylene imine resin, without being limited thereto.

Third Retardation Layer

In the polarizing plate, the third retardation layer 300 is stacked on a lower surface of the second retardation layer. In a structure wherein the third retardation layer is stacked on an upper surface of the second retardation layer in the polarizing plate such that the first retardation layer, the third retardation layer, and the second retardation layer are sequentially stacked on the polarizer, there can be a problem of insufficient blocking of external light.

The third retardation layer exhibits positive dispersion in which in-plane retardation gradually increases from a long wavelength to a short wavelength. As a result, the polarizing plate can assist in reduction of color scattering and reflectivity in application to an optical display device. Specifically, the third retardation layer may satisfy Relations 4 and 5:

$$\text{about } 1.0 < Re(450)/Re(550) \leq \text{about } 1.2 \qquad \text{[Relation 4]}$$

$$\text{about } 0.9 \leq Re(650)/Re(550) < \text{about } 1.0, \qquad \text{[Relation 5]}$$

where Re(450), Re(550), and Re(650) are in-plane retardations (unit: nm) of the third retardation layer at wavelengths of 450 nm, 550 nm, and 650 nm, respectively.

In one embodiment, the third retardation layer may have Re(450)/Re(550) of about 1.05 to about 1.15, more specifically about 1.1 to about 1.15. Within this range, the polarizing plate can secure good effects in reduction of reflectivity at both the front side and the lateral side. For example, the third retardation layer may have Re(450)/Re(550) of about 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, or 1.2. In one embodiment, the third retardation layer may have Re(650)/Re(550) of greater than about 0.9 to about 0.95. Within this range, the polarizing plate can secure good effects in reduction of reflectivity at both a front side and a lateral side. For example, the third retardation layer may have Re(650)/Re(550) of about 0.9, 0.91, 0.92, 0.93, 0.94, 0.95, 0.96, 0.97, 0.98, 0.99, or 0.999.

The third retardation layer may have an in-plane retardation of about 80 nm to about 145 nm at a wavelength of 550 nm. Within this range, the polarizing plate can assist in reduction of color scattering and reflectivity. Specifically, the third retardation layer may have an in-plane retardation of about 80 nm to about 140 nm, more specifically about 80 nm to about 135 nm, still more specifically about 80 nm to about 130 nm, still more specifically about 90 nm to about 130 nm. For example, the third retardation layer may have an in-plane retardation of about 80 nm, 85 nm, 90 nm, 95 nm, 100 nm, 105 nm, 110 nm, 115 nm, 120 nm, 125 nm, 130 nm, 135 nm, 140 nm, or 145 nm at a wavelength of 550 nm.

In one embodiment, the third retardation layer may have an in-plane retardation of about 100 nm to about 160 nm, specifically about 105 nm to about 155 nm, more specifically about 110 nm to about 150 nm at a wavelength of 450 nm. Within this range, the polarizing plate can reach the aforementioned wavelength dispersion while assisting in reduction of reflectivity at both a front side and a lateral side. For example, the third retardation layer may have an in-plane retardation of about 100 nm, 105 nm, 110 nm, 115 nm, 120 nm, 125 nm, 130 nm, 135 nm, 140 nm, 145 nm, 150 nm, 155 nm, or 160 nm at a wavelength of 450 nm.

In one embodiment, the third retardation layer may have an in-plane retardation of about 80 nm to about 140 nm, specifically about 85 nm to about 135 nm, more specifically about 90 nm to about 130 nm at a wavelength of 650 nm. Within this range, the polarizing plate can reach the aforementioned wavelength dispersion while assisting in reduction of reflectivity at both a front side and a lateral side. For example, the third retardation layer may have an in-plane retardation of about 80 nm, 85 nm, 90 nm, 95 nm, 100 nm, 105 nm, 110 nm, 115 nm, 120 nm, 125 nm, 130 nm, 135 nm, or 140 nm at a wavelength of 650 nm.

The third retardation layer has a refractive index according to Relation 6. With this structure, the polarizing plate can reduce reflectivity at a lateral side.

$$nx \approx nz > ny,$$ [Relation 6]

where nx, ny, and nz are indexes of refraction of the third retardation layer in the slow axis direction, the fast axis direction and the thickness direction at a wavelength of 550 nm, respectively.

In one embodiment, the third retardation layer is a negative A retardation layer. As a result, the polarizing plate can have a good effect in reduction of reflectivity at a lateral side.

The slow axis of the second retardation layer is present between the absorption axis of the polarizer and the slow axis of the third retardation layer. The slow axis of the third retardation layer is tilted at a particular angle with respect to the absorption axis of the polarizer.

Referring to FIG. 2, assuming the absorption axis of the polarizer 400 is tilted at an angle of 0°, an angle θ3 defined between the slow axis 310 of the third retardation layer 300 and the absorption axis of the polarizer 410 may range from about +79° to about +89° or from about −89° to about −79°. Within this range, the polarizing plate can assist in reduction of color scattering and reflectivity while improving productivity by securing the effects of the present invention even when the third retardation layer is bonded to the polarizer through a roll-to-roll process. Preferably, the angle ranges from about +81° to about +87° or from about −87° to about −81°, specifically from about +82° to about +86° or from about −86° to about −82°. For example, the angle θ3 may be about +79°, +80°, +81°, +82°, +83°, +84°, +85°, +86°, +87°, +88° or +89°, or about −89°, −88°, −87°, −86°, −85°, −84°, −83°, −82°, −81°, −80°, or −79°.

The above angle may be realized through adjustment of the angle between the absorption axis and the slow axis of the third retardation layer upon bonding the third retardation layer to the polarizer. Referring to FIG. 2, each of the polarizer and the third retardation layer is substantially parallel to the MD to allow manufacture of the polarizing plate through the roll-to-roll process, thereby improving productivity. As a result, the third retardation layer has a slow axis tilted at an angle of about +79° to about +89° or about −89° to about −79°, preferably about +81° to about +87° or about −87° to about −81°, more preferably about +82° to about +86° or about −86° to about −82°, with respect to the MD thereof, achieving the effects of the present invention.

In one embodiment, referring to FIG. 2, the angle θ2 may range from about +14° to about +24° and the angle θ3 may range from about +79° to about +89°. For example, the angle θ2 may be about +14°, +15°, +16°, +17°, +18°, +19°, +20°, +21°, +22°, +23°, or +24°, and the angle θ3 may be about +79°, +80°, +81°, +82°, +83°, +84°, +85°, +86°, +87°, +88°, or +89°.

In another embodiment, referring to FIG. 2, the angle θ2 may range from about −24° to about −14°, and the angle θ3 may range from about −89° to about −79°. For example, the angle θ2 may be about −24°, −23°, −22°, −21°, −20°, −19°, −18°, −17°, −16°, −15°, or −14°, and the angle θ3 may be about −89°, −88°, −87°, −86°, −85°, −84°, −83°, −82°, −81°, −80°, or −79°.

Unlike the second retardation layer, the third retardation layer has a negative out-of-plane retardation at a wavelength of 550 nm, for example, about −110 nm to about −50 nm, specifically about −110 nm to about −60 nm, more specifically about −100 nm to about −70 nm. Within this range, the polarizing plate can achieve improvement in front reflectivity and lateral reflectivity. For example, the third retardation layer may have an out-of-plane retardation of about −110 nm, −105 nm, −100 nm, −95 nm, −90 nm, −85 nm, −80 nm, −75 nm, −70 nm, −65 nm, −60 nm, −55 nm, or −50 nm at a wavelength of 550 nm.

The third retardation layer may have a degree of biaxiality of about −1.0 to about 0.5, specifically about −1.0 to about 0, more specifically about −1.0 to less than about 0, at a wavelength of 550 nm. Within this range, the polarizing plate can achieve improvement in front reflectivity and lateral reflectivity. For example, the third retardation layer may have a degree of biaxiality of about −1.0, −0.9, −0.8, −0.7, −0.6, −0.5, −0.4, −0.3, −0.2, −0.1, 0, 0.1, 0.2, 0.3, 0.4, or 0.5 at a wavelength of 550 nm.

The third retardation layer may have a thickness of about 2 μm to 15 μm, specifically about 3 μm to about 10 μm. Within this thickness range, the third retardation layer can be used in the polarizing plate. For example, the third retardation layer may have a thickness of about 2 μm, 3 μm, 4 μm, 5 μm, 6 μm, 7 μm, 8 μm, 9 μm, 10 μm, 11 μm, 12 μm, 13 μm, 14 μm, or 15 μm.

An angle between the slow axis of the second retardation layer and the slow axis of the third retardation layer may be set in a particular range to improve productivity of the polarizing plate.

Referring to FIG. 2, an angle θ1 between the slow axis 210 of the second retardation layer 200 and the slow axis 310 of the third retardation layer 300 may range from about 61° to about 67°, preferably about 63° to about 66°. Within this range, the polarizing plate can block reflected light. For example, the angle θ1 may be about 61°, 62°, 63°, 64°, 65°, 66°, or 67°.

The third retardation layer may be formed of a composition including a resin having a negative inherent birefringence.

The resin having a negative inherent birefringence includes a polymer having a negative inherent birefringence. The polymer having a negative inherent birefringence may include at least one selected from among, for example, a homopolymer of styrene or styrene derivatives, a polystyrene polymer including a copolymer of styrene or styrene derivatives and a comonomer, a polyacrylonitrile polymer, a poly(methyl methacrylate) copolymer, and a cellulose copolymer, such as cellulose ester, without being limited thereto. The comonomer may include one of acrylonitrile, maleic anhydride, methyl methacrylate, and butadiene. Preferably, the third retardation layer includes at least one selected from among a polystyrene polymer and a cellulose copolymer, more preferably a polystyrene polymer.

The third retardation layer may further include typical additives in addition to the resin having a negative inherent birefringence. For example, the additives may include plasticizers, anti-pigmenting agents, such as pigments and dyes, heat stabilizers, photo-stabilizers, UV absorbents, antistatic agents, antioxidants, fine particles, and surfactants, without being limited thereto.

Positive dispersion of the third retardation layer may be regulated in consideration of not only the kind of resin having a negative inherent birefringence but also the ratio of monomers in the resin.

A process of manufacturing the third retardation layer will be described below in detail.

Laminate of Second Retardation Layer and Third Retardation Layer

A laminate of the second retardation layer and the third retardation layer exhibits negative dispersion in which in-plane retardation gradually decreases from a long wavelength to a short wavelength. As a result, in the polarizing plate according to the present invention, although the laminate of the second retardation layer and the third retardation layer exhibits negative dispersion, each of the second retardation layer and the third retardation layer is formed to exhibit positive dispersion, thereby further reducing lateral reflectivity and color scattering while further improving screen quality in application to an optical display device, as compared with a polarizing plate including a single negative dispersion film.

In one embodiment, the laminate of the second retardation layer and the third retardation layer may have an in-plane retardation of about 140 nm to about 200 nm, specifically about 140 nm to about 195 nm, more specifically about 140 nm to about 190 nm, more specifically about 150 nm to about 190 nm at a wavelength of 550 nm. Within this range, the polarizing plate can reduce lateral reflectivity. For example, the laminate of the second retardation layer and the third retardation layer may have an in-plane retardation of about 140 nm, 145 nm, 150 nm, 155 nm, 160 nm, 165 nm, 170 nm, 175 nm, 180 nm, 185 nm, 190 nm, 195 nm, or 200 nm at a wavelength of 550 nm.

In one embodiment, the laminate of the second retardation layer and the third retardation layer may have an out-of-plane retardation about 5 nm to about 200 nm, specifically about 10 nm to about 150 nm, more specifically about 50 nm to about 150 nm, more specifically about 50 nm to about 100 nm at a wavelength of 550 nm. Within this range, the polarizing plate can reduce lateral reflectivity. For example, the laminate of the second retardation layer and the third retardation layer may have an out-of-plane retardation about 5 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 105 nm, 110 nm, 115 nm, 120 nm, 125 nm, 130 nm, 135 nm, 140 nm, 145 nm, 150 nm, 155 nm, 160 nm, 165 nm, 170 nm, 175 nm, 180 nm, 185 nm, 190 nm, 195 nm, or 200 nm at a wavelength of 550 nm.

The laminate of the second retardation layer and the third retardation layer may have a thickness of greater than about 0 μm to about 70 μm, specifically about 5 μm to about 60 μm, more specifically about 10 μm to about 60 μm. Within this thickness range, the laminate can be used in the polarizing plate.

The laminate of the second retardation layer and the third retardation layer will hereinafter be described in more detail.

In one embodiment, the third retardation layer may be a stretched film. The third retardation layer may be bonded to the second retardation layer via an adhesive layer and/or a bonding layer.

The third retardation layer may be formed by preparing a non-stretched film through melt molding, injection molding, or press molding of the composition for the third retardation layer, followed by stretching the non-stretched film in a slanted direction. The non-stretched film may be stretched to about 1.1 times or more, about 4.0 times or less, specifically about 1.3 times to about 3.0 times, an initial length of the non-stretched film. Within this range, the slow axis direction of the third retardation layer can be controlled and the index of refraction of the third retardation layer in a stretching direction can be increased. Stretching may be performed at a glass transition temperature (Tg) of the non-stretched film+2° C. or more to Tg+30° C. or less.

The stretching direction may be set to allow easy manufacture of the polarizing plate through a roll-to-roll process while satisfying the angle between the third retardation layer and the absorption angle of the polarizer.

In another embodiment, the third retardation layer may be a coating layer.

In this embodiment, the third retardation layer may be directly formed on the second retardation layer such that the laminate of the second retardation layer and the third retardation layer becomes a single sheet type monolayer film. With this structure, the polarizing plate allows roll-to-roll bonding upon bonding of the laminate of the second retardation layer and the third retardation layer to the polarizer, thereby improving processability and production yield through reduction in defect rate. Although the second retardation layer and the third retardation layer have different retardation values, the third retardation layer is directly formed on the second retardation layer, thereby enabling thickness reduction and improvement in processability of the polarizing plate.

The third retardation layer may be manufactured by tilt stretching a laminate prepared by coating the composition for the third retardation layer on the film for the second retardation layer.

First Retardation Layer

The first retardation layer 100 is stacked on the upper surface of the second retardation layer. A structure wherein the first retardation layer is disposed between the second retardation layer and the third retardation layer or stacked on a lower surface of the third retardation layer can cause significant color scattering while increasing reflectivity.

The first retardation layer may be a positive C retardation layer that satisfies Relation 7. With this structure, the polarizing plate can reduce reflectivity at a lateral side.

$$nz > nx \approx ny,$$ [Relation 7]

where nx, ny, and nz are indexes of refraction of the first retardation layer in the slow axis direction, the fast axis direction and the thickness direction at a wavelength of 550 nm, respectively.

In one embodiment, the first retardation layer may have an out-of-plane retardation about −150 nm to about 0 nm, specifically about −150 nm to about −10 nm, more specifically about −150 nm to about −50 nm at a wavelength of 550 nm. Within this range, the effects of the present invention can be further improved. For example, the first retardation layer may have an out-of-plane retardation about −150 nm, −145 nm, −140 nm, −135 nm, −130 nm, −125 nm, −120 nm, −115 nm, −110 nm, −105 nm, −100 nm, −95 nm, −90 nm, −85 nm, −80 nm, −75 nm, −70 nm, −65 nm, −60 nm, −55 nm, −50 nm, −45 nm, −40 nm, −35 nm, −30 nm, −25 nm, −20 nm, −15 nm, −10 nm, −5 nm, or 0 nm at a wavelength of 550 nm.

In one embodiment, the first retardation layer may have an in-plane retardation of about 0 nm to about 10 nm, specifically about 0 nm to about 5 nm at a wavelength of 550 nm. Within this range, the effects of the present invention can be further improved. For example, the first retardation layer may have an in-plane retardation of about 0 nm, 1 nm, 2 nm, 3 nm, 4 nm, 5 nm, 6 nm, 7 nm, 8 nm, 9 nm, or about 10 nm at a wavelength of 550 nm.

In one embodiment, first retardation layer may have nx of about 1.5 to about 1.6, ny of about 1.5 to about 1.6, and nz of about 1.6 to about 1.7 at a wavelength of 550 nm. Within this range, the effects of the present invention can be further improved.

For example, the first retardation layer may have an index of refraction (nx) of about 1.5, 1.51, 1.52, 1.53, 1.54, 1.55, 1.56, 1.57, 1.58, 1.59, or 1.6, an index of refraction (ny) of about 1.5, 1.51, 1.52, 1.53, 1.54, 1.55, 1.56, 1.57, 1.58, 1.59, or 1.6, or an index of refraction (nz) of about 1.6, 1.61, 1.62, 1.63, 1.64, 1.65, 1.66, 1.67, 1.68, 1.69 or 1.7, at a wavelength of 550 nm.

The first retardation layer may be a stretched film or a coating layer so long as the first retardation layer can realize the positive C retardation layer described above.

In one embodiment, the first retardation layer may be a stretched film. The stretched film may be formed of a composition including a polymer known to those skilled in the art, for example, a fumaric diester resin, without being limited thereto.

In another embodiment, the first retardation layer may be a coating layer. The coating layer may include liquid crystals to allow easy implementation of out-of-plane retardation. The liquid crystals may be selected from typical liquid crystals well-known to those skilled in the art, for example, nematic liquid crystals.

The first retardation layer may have a thickness of greater than about 0 μm to about 70 μm, specifically about 5 μm to about 60 μm, more specifically about 10 μm to about 60 μm. Within this thickness range, the laminate can be used in the polarizing plate.

The first retardation layer may be directly formed on the second retardation layer or may be bonded thereto via an adhesive layer and/or a bonding layer.

Laminate of First Retardation Layer, Second Retardation Layer and Third Retardation Layer The laminate of the first retardation layer, the second retardation layer and the third retardation layer may have a degree of biaxiality of about 0.4 to about 1.0, specifically about 0.4 to about 0.9, about 0.4 to about 0.7, about 0.4 to about 0.6, about 0.4 to about 0.5 at a wavelength of 550 nm. Within this range, the polarizing plate can reduce reflectivity in the range of about 5° to about 60° while further reducing color scattering. For example, the laminate of the first retardation layer, the second retardation layer and the third retardation layer may have a degree of biaxiality of about 0.4, 0.5, 0.6, 0.7, 0.8, 0.9, or 1.0 at a wavelength of 550 nm.

Polarizer

The polarizer 400 is stacked on an upper surface of the first retardation layer to reduce lateral reflectivity by linearly polarizing external light or light received from the first retardation layer.

The polarizer may have a degree of polarization of about 99% or more and a single light transmittance (Ts) of about 44% or more. By satisfying both the degree of polarization and the single light transmittance at the same time, the polarizer can achieve substantial reduction in lateral reflectivity at the entire lateral side, particularly in the overall range of a polar angle (θ) of 5° to 60°, when stacked on the laminate of the first retardation layer, the second retardation layer and the third retardation layer. Here, "single light transmittance" means light transmittance (Ts) measured in the visible spectrum, for example, at a wavelength of 400 nm to 700 nm, and may be measured by a typical method known to those skilled in the art. The "degree of polarization" may be measured by a typical method known to those skilled in the art. Specifically, the polarizer may have a degree of polarization of about 99% to about 99.9999% and a light transmittance (Ts) of about 44% to about 50%.

The polarizer may have an orthogonal light transmittance (Tc) of about 0.001% to about 0.7%, specifically about 0.01% to about 0.2%, more specifically about 0.05% to about 0.2% at a wavelength of 380 nm to 780 nm. Within this range, the polarizer can have an antireflection effect at a lateral side, particularly in the overall range of a polar angle (θ) of 5° to 60°.

The polarizer is bonded to the laminate of the first retardation layer, the second retardation layer and the third retardation layer through a roll-to-roll process, so that the MD of the polarizer is substantially the same as the MD of each of the first retardation layer, the second retardation layer and the third retardation layer. Accordingly, the laminate of the first retardation layer, the second retardation layer and the third retardation layer acts as a lower protective film for the polarizer to allow elimination of a separate protective film on a lower surface of the polarizer, thereby enabling thickness reduction of the polarizing plate.

The absorption axis of the polarizer corresponds to the MD of the polarizer and may become the stretching direction in manufacture of the polarizer. The polarizer may include a polyvinyl alcohol-based polarizer formed through uniaxial stretching of a polyvinyl alcohol film or a polyene-based polarizer formed by dehydrating a polyvinyl alcohol film. In one embodiment, the polarizer may be manufactured by dyeing, stretching, crosslinking, and color correction of a polyvinyl alcohol film. The polarizer having the degree of polarization and light transmittance within the above ranges can be obtained through suitable adjustment of conditions for dyeing, stretching, crosslinking, and color correction.

The polarizer may have a thickness of about 5 μm to about 40 μm. Within this range, the polarizer can be used in the polarizing plate. For example, the polarizer may have a thickness of about 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, or 40 μm.

Although not shown in FIG. 1, an adhesive layer, a bonding layer or an adhesive bonding layer, or a protective layer described below may be further formed between the polarizer and the first retardation layer.

Protective Layer

The protective layer 500 may be stacked on an upper surface of the polarizer to protect the polarizer. The protective layer protects the polarizer to improve reliability and mechanical strength of the polarizing plate. The protective layer may be omitted from the polarizing plate of FIG. 1 so long as the polarizing plate can secure mechanical strength without the protective layer.

The protective layer may include at least one selected from among an optically transparent protective film and an optically transparent protective coating layer. The protective film may include at least one selected from among cellulose ester resins including triacetylcellulose (TAC), cyclic polyolefin resins including amorphous cyclic olefin polymer (COP), polycarbonate resins, polyester resins including polyethylene terephthalate (PET), polyether sulfone resins, polysulfone resins, polyamide resins, polyimide resins, non-cyclic polyolefin resins, poly(meth)acrylate resins including poly(methyl methacrylate), polyvinyl alcohol resins, polyvinyl chloride resins, and polyvinylidene chloride resins, without being limited thereto.

The protective coating may be formed of an actinic radiation-curable resin composition including an actinic radiation-curable compound and a polymerization initiator. The actinic radiation-curable compound may include at least one selected from among a cationic polymerizable curable compound, a radical polymerizable curable compound, a urethane resin, and a silicone resin.

The protective layer may be a non-retardation film or may have a smaller in-plane retardation value than the second retardation layer and the third retardation layer and a smaller absolute out-of-plane retardation value than the first retardation layer. For example, the protective layer may have an in-plane retardation of about 120 nm to about 160 nm, or about 5 nm to about 0 nm at a wavelength of 550 nm. Within this range, the protective layer can protect the polarizing plate without affecting the effects of the first retardation layer, the second retardation layer and the third retardation layer.

The protective layer may have a thickness of about 10 μm or less, about 5 μm to about 300 μm, about 5 μm or less, or about 5 μm to about 200 μm. Within this range, the protective layer can be used in the polarizing plate.

Although not shown in FIG. 1, the polarizing plate may further include a functional coating layer on an upper surface of the protective layer. The functional coating layer may include at least one selected from among a hard coating layer, an anti-fingerprint layer, an anti-reflective layer, a low reflectivity layer, and an ultra-low reflectivity layer, without being limited thereto.

Although not shown in FIG. 1, an adhesive layer and/or a bonding layer may be further formed on a lower surface of the third retardation layer to stack the polarizing plate on an optical display device.

Next, an optical display device according to the present invention will be described.

The optical display device according to the present invention may include at least one of the polarizing plates according to the present invention. In one embodiment, the optical display device may include a liquid crystal display and a light emitting diode display, preferably a light emitting diode display. The liquid crystal display may include a liquid crystal display including liquid crystals for IPS (In-Plane Switching). The light emitting diode display includes an organic light emitting diode display or an organic/inorganic light emitting diode display, for example, a light emitting diode (LED), an organic light emitting diode (OLED), a quantum dot light emitting diode (QLED), and a light emitting device including a light emitting material, such as phosphors.

Next, the present invention will be described in more detail with reference to examples. However, it should be noted that these examples are provided for illustration only and should not be construed in any way as limiting the invention.

Example 1

A polyvinyl alcohol film was stretched to 3 times an initial length thereof in an iodine solution at 60° C. to allow adsorption of iodine thereto, followed by further stretching the polyvinyl alcohol film to 2.5 times in an aqueous solution of boric acid at 40° C., thereby preparing a 12 μm thick polarizer.

A triacetylcellulose (TAC) film (KA25-HC, thickness: 32 μm, Konica Minolta Opto Inc.) having a hard coating layer was bonded to an upper surface of the polarizer. A laminate of a first retardation layer, a second retardation layer and a third retardation layer described below was stacked on a lower surface of the polarizer by sequentially bonding the first retardation layer, the second retardation layer and the third retardation layer to the lower surface of the polarizer, thereby preparing a polarizing plate through a roll-to-roll process. Here, an angle of the slow axis of the second retardation layer and an angle of the slow axis of the third retardation layer with respect to the absorption axis of the polarizer were regulated as listed in Table 1.

With respect to a laminate film [negative dispersion, Re(450)/Re(550)=0.93, Re(650)/Re(550)=1.03] of the second retardation layer [positive dispersion, cyclic polyolefin resin, Re(450)=253.7 nm, Re(550)=250 nm, Re(650)=249.7 nm, Re(450)/Re(550)=1.015, Re(650)/Re(550)=0.999] and the third retardation layer [positive dispersion, polystyrene, Re(450)=127.6 nm, Re(550)=115 nm, Re(650)=109.1 nm, Re(450)/Re(550)=1.110, Re(650)/Re(550)=0.948], a liquid crystal composition (DNP) was coated and dried as a composition for a first retardation layer on an upper surface of the second retardation layer to form the first retardation layer [positive C plate, Rth=−85 nm, nx=1.57156, ny=1.57127, and nz=1.65717 at 550 nm], thereby preparing a laminate of the first retardation layer, the second retardation layer and the third retardation layer. The laminate had a degree of biaxiality of 0.49 at a wavelength of 550 nm.

The laminate film was formed by tilt-stretching a cyclic polyolefin copolymer resin at a certain elongation and coating a polystyrene copolymer on one surface of the stretched cyclic polyolefin copolymer resin film to form a laminate, followed by stretching the laminate at a certain elongation.

Examples 2 and 3

Polarizing plates were manufactured in the same manner as in Example 1 except that details of the polarizing plate were changed as listed in Table 1.

Comparative Example 1

A polarizing plate was prepared in the same manner as in Example 1 except that a QWP film (modified PC, Re=139 nm at 550 nm, Teijin Co., Ltd.,) exhibiting negative dispersion was stacked on the lower surface of the polarizer.

Comparative Example 2

A polarizing plate was prepared in the same manner as in Example 1 except that the second retardation layer and the third retardation layer were sequentially stacked in the stated order on the lower surface of the polarizer without the first retardation layer.

Comparative Example 3

A polarizing plate was prepared in the same manner as in Example 1 except that the second retardation layer, the third retardation layer, and the first retardation layer were sequentially stacked in the stated order on the lower surface of the polarizer.

Comparative Example 4

A polarizing plate was prepared in the same manner as in Example 1 except that the first retardation layer and an HM film (modified PC, negative dispersion, Re=139 nm at 550 nm, Teijin Co., Ltd.) were sequentially stacked in the stated order on the lower surface of the polarizer.

Details of the polarizing plates of Examples and Comparative Example are shown in Table 1.

TABLE 1

| | Stacking sequence | First retardation layer | Second retardation layer Re (nm) | θ2 (°) | Third retardation layer Re (nm) | θ3 (°) | NZ |
|---|---|---|---|---|---|---|---|
| Example 1 | I | +C | 250 | +19.5 | 115 | +84 | 0.49 |
| Example 2 | I | +C | 250 | +19 | 115 | +83 | 0.49 |
| Example 3 | I | +C | 250 | +20 | 115 | +85 | 0.49 |
| Comparative Example 1 | — | Absent | — | — | 139 | +45 | 1.12 |
| Comparative Example 2 | II | Absent | 250 | +19.5 | 115 | +84 | 0.97 |
| Comparative Example 3 | III | +C | 250 | +19.5 | 115 | +84 | 0.49 |
| Comparative Example 4 | IV | +C | — | — | 139 | +45 | 0.57 |

*In Table 1, I refers to a sequence of the first retardation layer, the second retardation layer and the third retardation layer on the lower surface of the polarizer;

II refers to a sequence of the second retardation layer and the third retardation layer on the lower surface of the polarizer;

III refers to a sequence of the second retardation layer, the third retardation layer, and the first retardation layer on the lower surface of the polarizer; and IV refers to a sequence of the first retardation layer and the negative dispersion retardation layer on the lower surface of the polarizer.

NZ refers to NZ of the laminate disposed on the lower surface of the polarizer at a wavelength of 550 nm.

Figure 3:
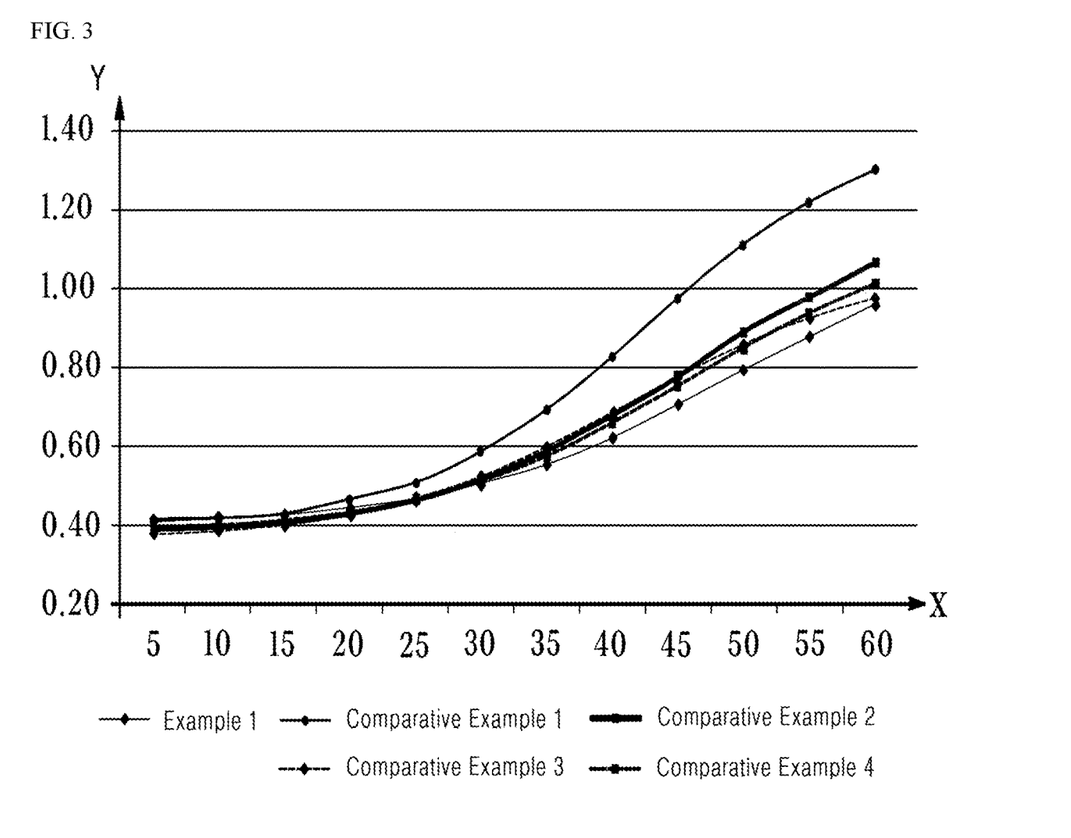
FIG. 3 is a graph depicting SCE reflectivity (Y-axis, unit: %) at a lateral polar angle (θ) (X-axis, unit: °) in application of each of polarizing plates of Examples and Comparative Examples to an OLED display.

Reflectivity (unit: %) of each of the polarizing plates of Examples and Comparative Examples was measured depending on a polar angle and results are shown in Table 2 and FIG. 3. Reflectivity was SCE (specular component excluded) reflectivity data measured on each of the polarization plates of Table 1 attached to a Galaxy S7 panel using a DMS803 (Instrument Systems, Germany).

Color scattering of each of the polarizing plates of Examples and Comparative Examples was measured depending on a polar angle by the SCE reflectivity measurement method and results are shown in Table 2. Color scattering was measured based on CIE a* and b* values and was evaluated by the SCE reflectivity measurement method, with each of the polarizing plates attached to a Galaxy S7 panel. Based on evaluation results, a moving distance of a reflected color was calculated at each azimuth and converted into a value for evaluation of color scattering. Color scattering indicates a difference in color values at a polar angle of 60° when an azimuth angle is changed from 0° to 180° by 45°. A lower value indicates lower color scattering and better screen quality.

TABLE 2

| | Reflectivity (%) according to lateral polar angle | | | | | | | Color scattering |
|---|---|---|---|---|---|---|---|---|
| | 5 | 10 | 20 | 30 | 40 | 50 | 60 | (polar angle = 60°) |
| Example 1 | 0.41 | 0.42 | 0.44 | 0.50 | 0.62 | 0.79 | 0.96 | 7.4 |
| Example 2 | 0.42 | 0.43 | 0.45 | 0.51 | 0.63 | 0.80 | 0.97 | 7.4 |
| Example 3 | 0.41 | 0.41 | 0.43 | 0.49 | 0.62 | 0.78 | 0.95 | 7.4 |
| Comparative Example 1 | 0.41 | 0.42 | 0.46 | 0.59 | 0.83 | 1.11 | 1.31 | 11.4 |
| Comparative Example 2 | 0.39 | 0.39 | 0.43 | 0.51 | 0.68 | 0.89 | 1.07 | 9.9 |
| Comparative Example 3 | 0.38 | 0.38 | 0.42 | 0.52 | 0.68 | 0.86 | 0.98 | 7.9 |
| Comparative Example 4 | 0.39 | 0.40 | 0.43 | 0.51 | 0.66 | 0.85 | 1.01 | 11.5 |

As shown in Table 2, the polarizing plates according to the present invention could remarkably reduce color scattering and reflectivity at a lateral side. The polarizing plates according to the present invention had low reflectivity and low color values. Referring to FIG. 3, the polarizing plates according to the present invention had low reflectivity at the overall polar angle in the range of 5° to 60°. In addition, the polarizing plates according to the present invention exhibited low color scattering according to the CIE a* and b* values at a polar angle of 60°. In particular, referring to Table 2, it could be seen that low lateral reflectivity did not secure sufficiently low color scattering.

On the contrary, referring to Table 2 and FIG. 3, the polarizing plate of Comparative Example 1 in which a negative dispersion film was stacked on the lower surface of the polarizer without a positive C layer and the polarizing plate of Comparative Example 4 in which a positive C layer and a negative dispersion film were stacked on the lower surface of the polarizer did not have the effects of the present invention. In particular, although the laminate of the second retardation layer and the third retardation layer exhibited negative dispersion, the polarizing plate including a negative dispersion film on the positive C layer as in Comparative Example 4 remarkably reduced lateral reflectivity and color scattering.

Further, referring to Table 2 and FIG. 3, the polarizing plate of Comparative Example 2 not including the positive C layer and the polarizing plate of Comparative Example 3 failing to satisfy the stacking sequence of the positive C layer, the second retardation layer and the third retardation layer according to the present invention could not achieve the effects of the present invention.

It should be understood that various modifications, changes, alterations, and equivalent embodiments can be made by those skilled in the art without departing from the spirit and scope of the present invention.

The invention claimed is:

1. A polarizing plate comprising:
a polarizer; and
a first retardation layer, a second retardation layer and a third retardation layer sequentially stacked on a lower surface of the polarizer,
wherein the first retardation layer is a positive C retardation layer;
the second retardation layer exhibits positive dispersion and has an in-plane retardation of about 220 nm to about 280 nm at a wavelength of 550 nm;
the third retardation layer exhibits positive dispersion and has an in-plane retardation of about 80 nm to about 145 nm at a wavelength of 550 nm; and
assuming an absorption axis of the polarizer is tilted at an angle of 0°, the second retardation layer has a slow axis tilted at an angle θ2 of about +14° to about +24° or of about −24° to about −14° with respect to the absorption axis of the polarizer and the third retardation layer has a slow axis tilted at an angle θ3 of about +79° to about +89° or of about −89° to about −79° with respect to the absorption axis of the polarizer.

2. The polarizing plate according to claim 1, wherein the angle θ2 ranges from about +14° to about +24° and the angle θ3 ranges from about +79° to about +89°.

3. The polarizing plate according to claim 1, wherein the angle θ2 ranges from about −24° to about −14° and the angle θ3 ranges from about-89° to about-79°.

4. The polarizing plate according to claim 1, wherein an angle θ1 defined between the slow axis of the second retardation layer and the slow axis of the third retardation layer ranges from about 61° to about 67°.

5. The polarizing plate according to claim 1, wherein a laminate of the first retardation layer, the second retardation layer and the third retardation layer has a degree of biaxiality of about 0.4 to about 1.0 at a wavelength of 550 nm.

6. The polarizing plate according to claim 1, wherein one of the second retardation layer and the third retardation layer satisfies Relation 3 and the other retardation layer satisfies Relation 6:

$$nx > ny \approx nz, \qquad \text{[Relation 3]}$$

where nx, ny, and nz are indexes of refraction of the retardation layer in a slow axis direction, a fast axis direction and a thickness direction at a wavelength of 550 nm, respectively;

$$nx \approx nz > ny, \qquad \text{[Relation 6]}$$

where nx, ny, and nz are indexes of refraction of the retardation layer in the slow axis direction, the fast axis direction and the thickness direction at a wavelength of 550 nm, respectively.

7. The polarizing plate according to claim 1, wherein a laminate of the second retardation layer and the third retardation layer exhibits negative dispersion.

8. The polarizing plate according to claim 1, wherein the second retardation layer satisfies Relation 1 and Relation 2:

$$\text{about } 1.0 < Re(450)/Re(550) \leq \text{about } 1.1 \qquad \text{[Relation 1]}$$

$$\text{about } 0.9 \leq Re(650)/Re(550) < \text{about } 1.0, \qquad \text{[Relation 2]}$$

where Re(450), Re(550), and Re(650) are in-plane retardations (unit: nm) of the second retardation layer at wavelengths of 450 nm, 550 nm, and 650 nm, respectively.

9. The polarizing plate according to claim 8, wherein the second retardation layer has a smaller Re(450)/Re(550) than the third retardation layer and a greater Re(650)/Re(550) than the third retardation layer.

10. The polarizing plate according to claim 1, wherein the third retardation layer satisfies Relation 4 and Relation 5:

$$\text{about } 1.0 < Re(450)/Re(550) \leq \text{about } 1.2 \qquad \text{[Relation 4]}$$

$$\text{about } 0.9 \leq Re(650)/Re(550) < \text{about } 1.0, \qquad \text{[Relation 5]}$$

where Re(450), Re(550), and Re(650) are in-plane retardations (unit: nm) of the third retardation layer at wavelengths of 450 nm, 550 nm, and 650 nm, respectively.

11. The polarizing plate according to claim 1, wherein the first retardation layer has an index of refraction (nx) of about 1.5 to about 1.6, an index of refraction (ny) of about 1.5 to about 1.6, and an index of refraction (nz) of about 1.6 to about 1.7 at a wavelength of 550 nm, where nx, ny, and nz are indexes of refraction of the retardation layer in the slow axis direction, the fast axis direction and the thickness direction at a wavelength of 550 nm, respectively.

12. The polarizing plate according to claim 1, wherein the first retardation layer has an out-of-plane retardation of about −150 nm to about 0 nm at a wavelength of 550 nm.

13. The polarizing plate according to claim 1, wherein second retardation layer comprises a cyclic olefin polymer film and the third retardation layer comprises a polystyrene coating layer.

14. The polarizing plate according to claim 1, further comprising:
   a protective layer stacked on an upper surface of the polarizer or between the polarizer and the first retardation layer.

15. The polarizing plate according to claim 1, further comprising:
   an adhesive layer or a bonding layer formed on a lower surface of the third retardation layer.

16. An optical display device comprising the polarizing plate according to claim 1 and one of a liquid crystal display or a light emitting diode display.

\* \* \* \* \*